(12) United States Patent
Hellman et al.

(10) Patent No.: US 6,422,375 B1
(45) Date of Patent: Jul. 23, 2002

(54) SYSTEM AND METHOD FOR TRANSPORTING AND REORIENTING ITEMS

(75) Inventors: Steven A. Hellman; Kevin L. Lambie, both of Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/608,384

(22) Filed: Jun. 30, 2000

(51) Int. Cl.[7] .............................................. B65G 15/00
(52) U.S. Cl. ........................ 198/408; 198/410; 198/404; 414/796.8; 414/796.4
(58) Field of Search ................................ 198/408, 404, 198/410, 464.1, 470.1, 801, 802, 370.07; 414/270, 271, 796.8, 796.4, 796.2, 796

(56) References Cited

U.S. PATENT DOCUMENTS

| 3,456,419 A | | 7/1969 | Vadas et al. | |
|---|---|---|---|---|
| 3,583,544 A | * | 6/1971 | Prodzenski | ................. 198/404 |
| 3,617,054 A | | 11/1971 | Schilling | |
| 3,981,494 A | | 9/1976 | Prestegaard | |
| 4,141,193 A | * | 2/1979 | Joa | ........................ 198/408 X |
| 4,518,156 A | | 5/1985 | Moser | |
| 4,615,521 A | | 10/1986 | Mori | |
| 4,700,941 A | * | 10/1987 | Shill | ...................... 414/796 X |
| 4,874,077 A | | 10/1989 | Yaguchi et al. | |
| 4,979,862 A | | 12/1990 | Bartlett et al. | |
| 5,031,892 A | | 7/1991 | Stieger | |
| 5,426,921 A | | 6/1995 | Beckmann | |
| 5,531,432 A | | 7/1996 | Sardella | |
| 5,561,968 A | | 10/1996 | Palmer | |
| 5,743,374 A | | 4/1998 | Monsees | |
| 6,209,704 B1 | * | 4/2001 | Pauling et al. | ............... 198/404 |
| 6,213,281 B1 | * | 4/2001 | Biondi et al. | ........... 198/408 X |
| 6,290,052 B2 | * | 9/2001 | Pauling et al. | ............... 198/404 |
| 2001/0013460 A1 | * | 8/2001 | Pauling et al. | ............... 198/404 |

FOREIGN PATENT DOCUMENTS

| EP | 563643 B1 | 10/1993 |
|---|---|---|
| SU | 1578037 A1 | 7/1990 |

* cited by examiner

*Primary Examiner*—Joseph D. Pape
*Assistant Examiner*—Patricia Engle
(74) *Attorney, Agent, or Firm*—Dority & Manning, P.A.

(57) ABSTRACT

A system and method for transporting and reorienting one or more items is provided. The system includes a first transport apparatus that can transport and reorient an item from a loading location to a first unloading location. For example, a first carder is movably secured to a frame of the first transport apparatus such that it can move at least about 180 degrees about the frame to the first unloading location. Moreover, the first carrier can also move about 90 degrees to a first transfer location. At the first transfer location, the items contained within the first carrier can, in some instances, also be pushed to a second carrier at a second transfer location. The second carrier is movably secured to a frame of a second transport apparatus such that it can move at least about 90 degrees to a second unloading location. The reoriented item(s) can be unloaded from a carrier at the first or second unloading locations.

30 Claims, 12 Drawing Sheets

SYSTEM AND METHOD FOR TRANSPORTING AND REORIENTING ITEMS

BACKGROUND OF THE INVENTION

In many manufacturing environments, various items, such as tissue cartons, boxes or cases containing tissue cartons, etc., often need to be transported from one location to another. For example, tissue cartons are often packaged into individual cardboard boxes which are stacked on a pallet. To utilize one or more of such cartons, the cartons must first be transported to an appropriate location where they can then removed from the individual box. In the past, the transportation of these cardboard boxes was often accomplished manually. For example, one or more persons lifted the box of cartons, carried it from one location to another location, flipped over the box, and then pulled off the cardboard box off, leaving only the cartons. However, because such transfers typically required high repetition of manually intensive acts, some semi- and fully-automated systems were developed to perform these acts.

Nevertheless, various problems have continued to exist with conventional semi- or fully-automated systems used for transporting and reorienting items. In particular, one problem with conventional systems is that they are inefficient and often expensive. For example, due to the complex nature of conventional systems, costly maintenance personnel may be required to keep the system working properly. In addition, the design of some semi- or fully-automated systems can adversely obstruct operators from access to the adjacent machinery. Moreover, many conventional systems are so large that they are not ergonomically suited for most manufacturing environments.

As such, a need currently exists for an improved system for transporting and reorienting items, such as cartons or boxes of cartons. In particular, a need currently exists for a transportation and reorientation system that is more efficient and ergonomical than conventional systems.

SUMMARY OF THE INVENTION

In accordance with one embodiment of the present invention, a system for selectively transporting and reorienting items from a loading location to one of a first or second unloading locations is disclosed. The system includes a first transport apparatus for selectively transporting and reorienting items from a loading location to either a first transfer location or a first unloading location. In some embodiments, the first transfer location has an orientation approximately 90 degrees in relation to the loading location and the first unloading location has an orientation approximately 180 degrees in relation to the loading location.

The first transport apparatus is formed from a first carrier for carrying items that is movably secured to a first frame. The first carrier is capable of being moved about the first frame from a loading location to a first transfer location and to a first unloading location. In some embodiments, the first frame can contain at least two upstanding members having a first end and a second end where at least two of the upstanding members are joined together at their first ends by a third member.

The system also includes a second transport apparatus for transporting and reorienting items from a second transfer location to a second unloading location. In some embodiments, the second unloading location has an orientation approximately 90 degrees in relation to the second transfer location. The second transport apparatus is formed from a second carrier for carrying items that is movably secured to a second frame. The second carrier is capable of being moved about the second frame from a second transfer location to a second unloading location. In some embodiments, the second frame can contain at least two upstanding members having a first end and a second end where at least two of the upstanding members are joined together at their first ends by a fourth member.

A transfer apparatus is also provided to operatively connect the first transport apparatus to the second transport apparatus. In particular, the transfer apparatus selectively moves items from the first transfer location to the second transfer location. For instance, in one embodiment, the transfer apparatus can contain a pusher assembly that moves items from the first carrier, when rotated to the first transfer location, into the second carrier, when rotated to the second transfer location.

In accordance with another embodiment of the present invention, a method of transporting and reorienting at least one item is also disclosed. The method includes the step of loading an item at a loading location into a first carrier that is movably secured to a first frame. The method further includes the step of moving the first carrier from the loading location to a first transfer location. In one embodiment, the first transfer location can have an orientation approximately 90 degrees in relation to the loading location. In some embodiments, the first carrier can then be moved from the first transfer location to a first unloading location. For example, in one embodiment, the first unloading location can have an orientation approximately 180 degrees in relation to the loading location.

In other embodiments, the item can be moved from the first carrier at the first transfer location to a second carrier at a second transfer location that is movably secured to a second frame. From the second transfer location, the second carrier can be moved to a second unloading location. In one embodiment, the second unloading location can have an orientation approximately 90 degrees in relation to the second transfer location. The item can be unloaded from either the first unloading location or the second unloading location.

Other features and aspects of the present invention are discussed in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Repeat use of references characters in the present specification and drawings is intended to represent same or analogous features or elements of the invention.

DETAILED DESCRIPTION OF RELATED EMBODIMENTS

Reference now will be made in detail to various embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents.

In general, the present invention is directed to a system and method for selectively transporting and reorienting items, such as tissue cartons or cases of tissue cartons, from a loading location to one of a first or second unloading location. The system includes a first transport apparatus for selectively transporting and reorienting items from a loading location to either a first transfer location or a first unloading location. The system also includes a second transport apparatus for transporting and reorienting items from a second transfer location to a second unloading location. In addition, a transfer apparatus is provided that operatively connects the first transport apparatus to the second transport apparatus. By utilizing a system of the present invention, it has been discovered that one or more items can be more efficiently and ergonomically transported and reoriented to a desired location.

Figure 1:
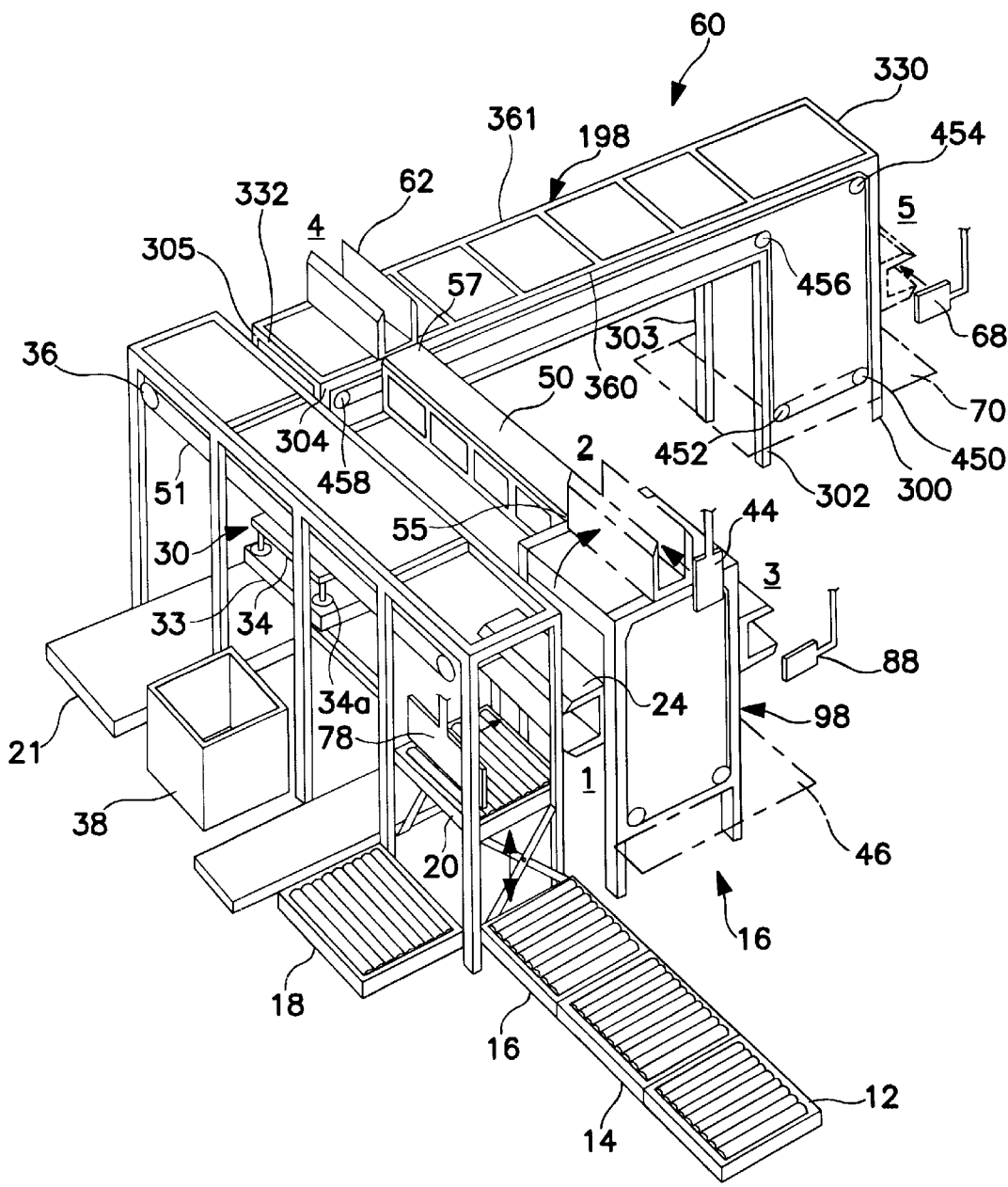
FIG. 1 is a perspective view of one embodiment of a system of the present invention for transporting and reorienting items.
Figure 2:
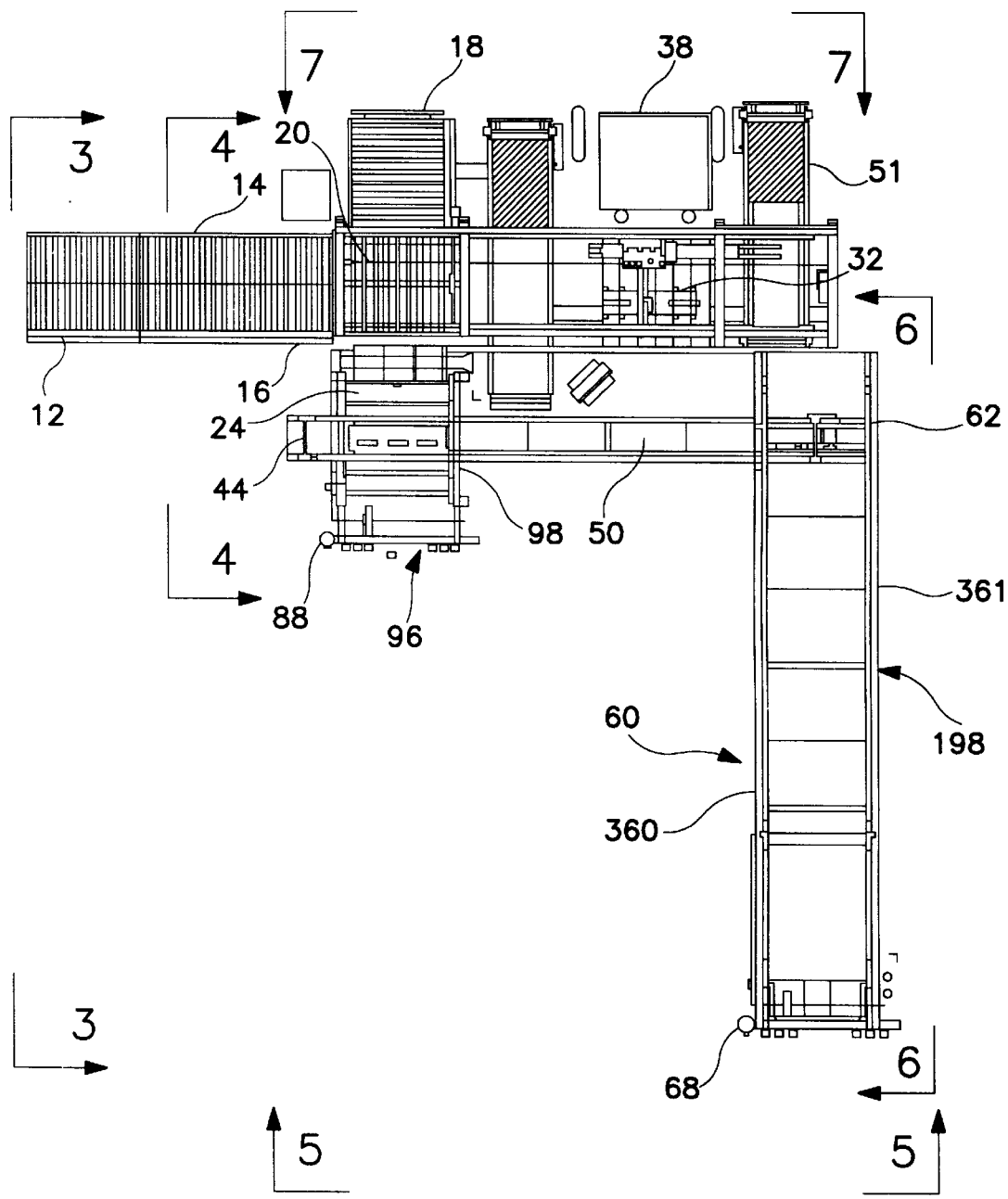
FIG. 2 is a top view of the system illustrated in FIG. 1.
Figure 3:
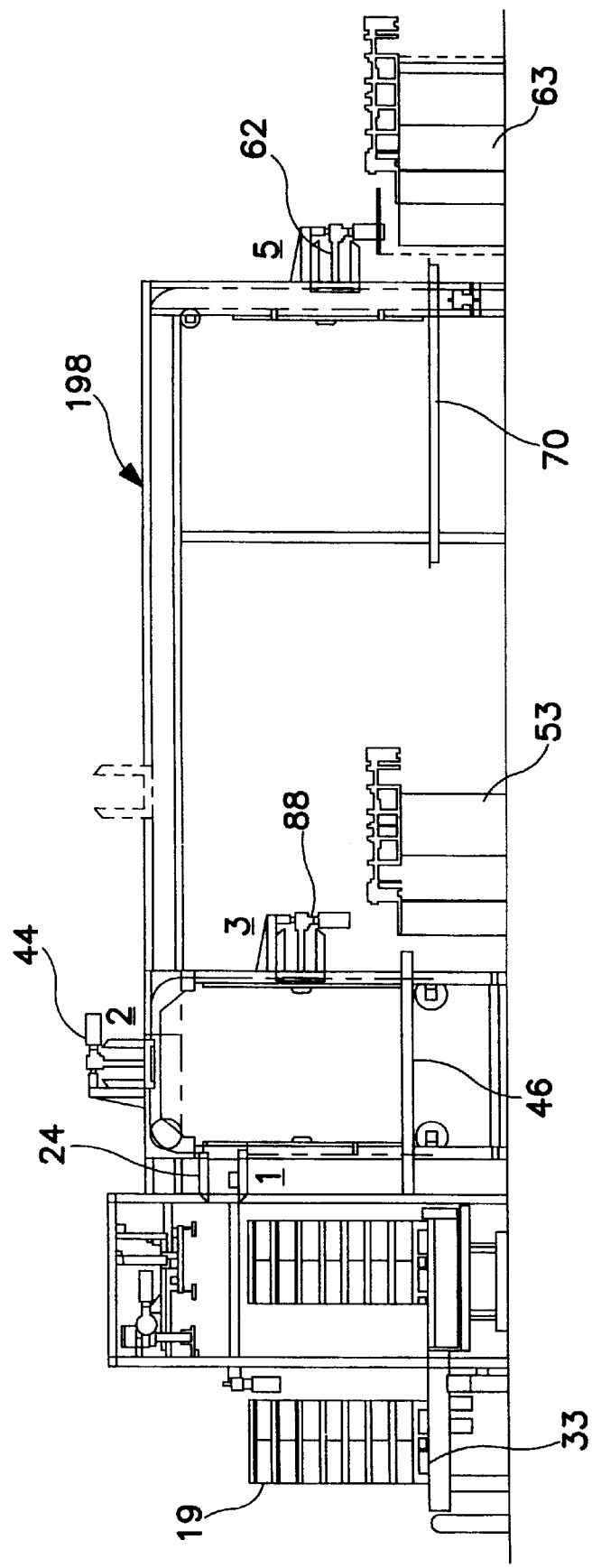
FIG. 3 is a side view of the system shown in FIG. 1 taken along a line 3—3 in FIG. 2.
Figure 4:
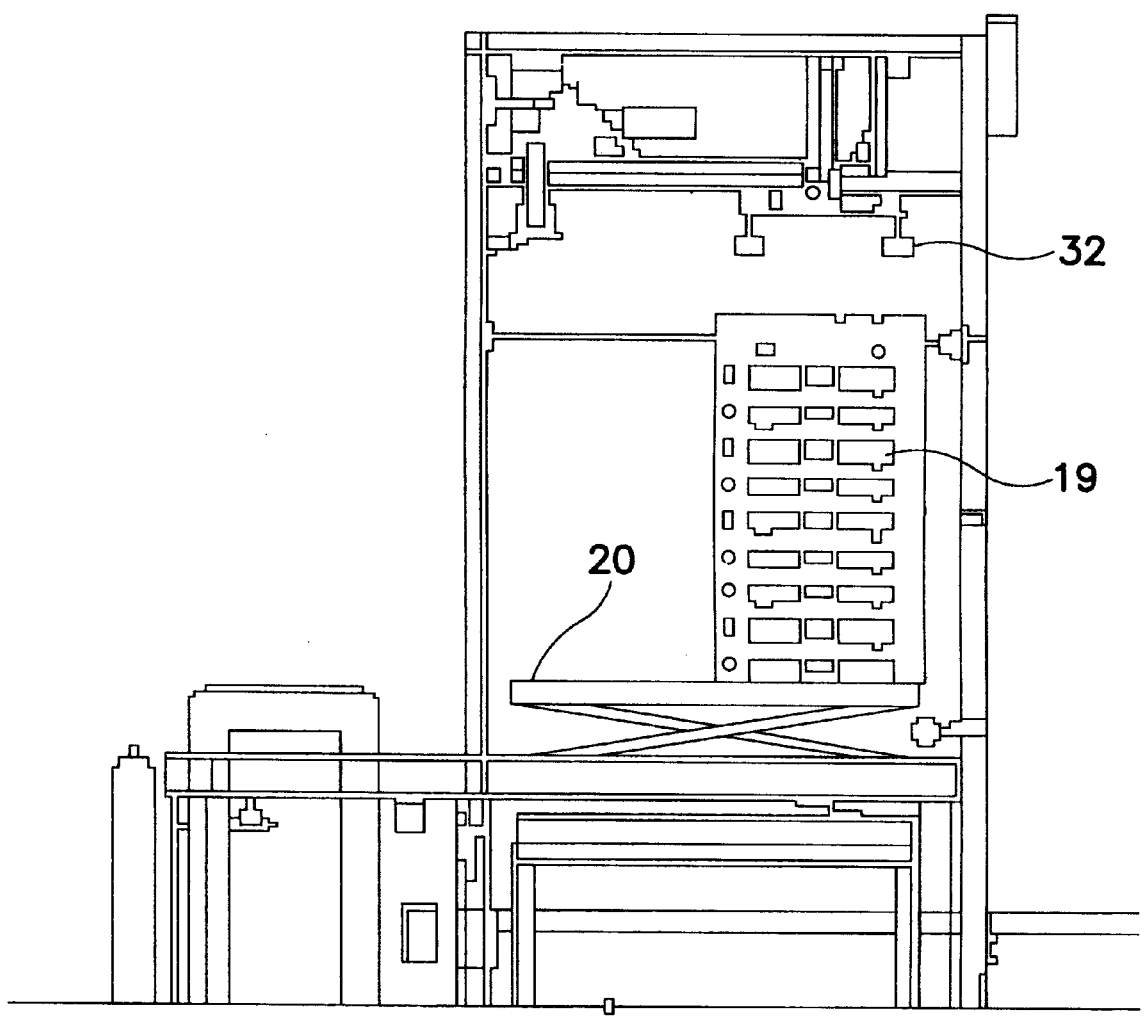
FIG. 4 is a side view of the system shown in FIG. 1 taken along a line 4—4 in FIG. 2.
Figure 5:
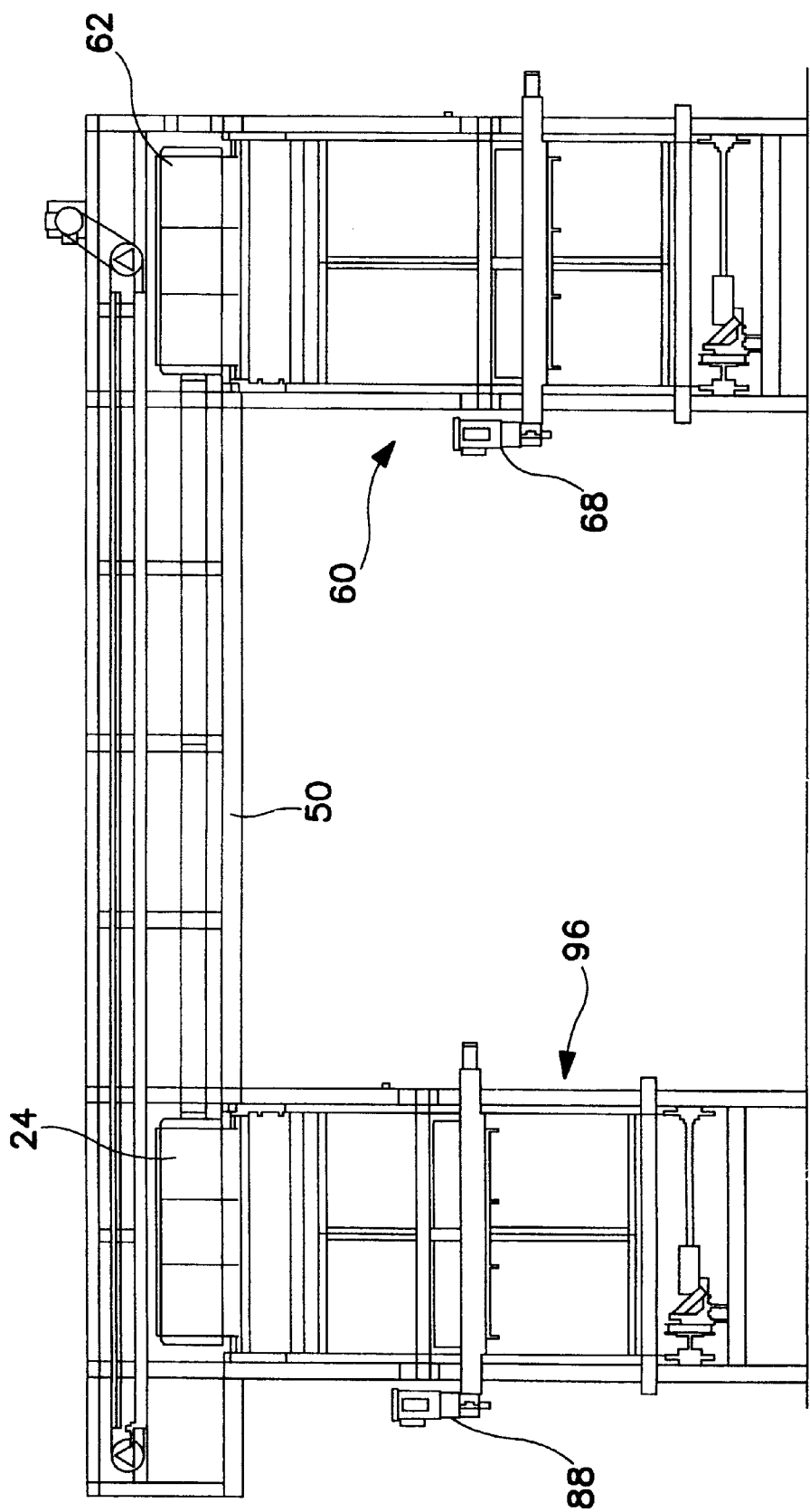
FIG. 5 is a side view of the system shown in FIG. 1 taken along a line 5—5 in FIG. 2.
Figure 6:
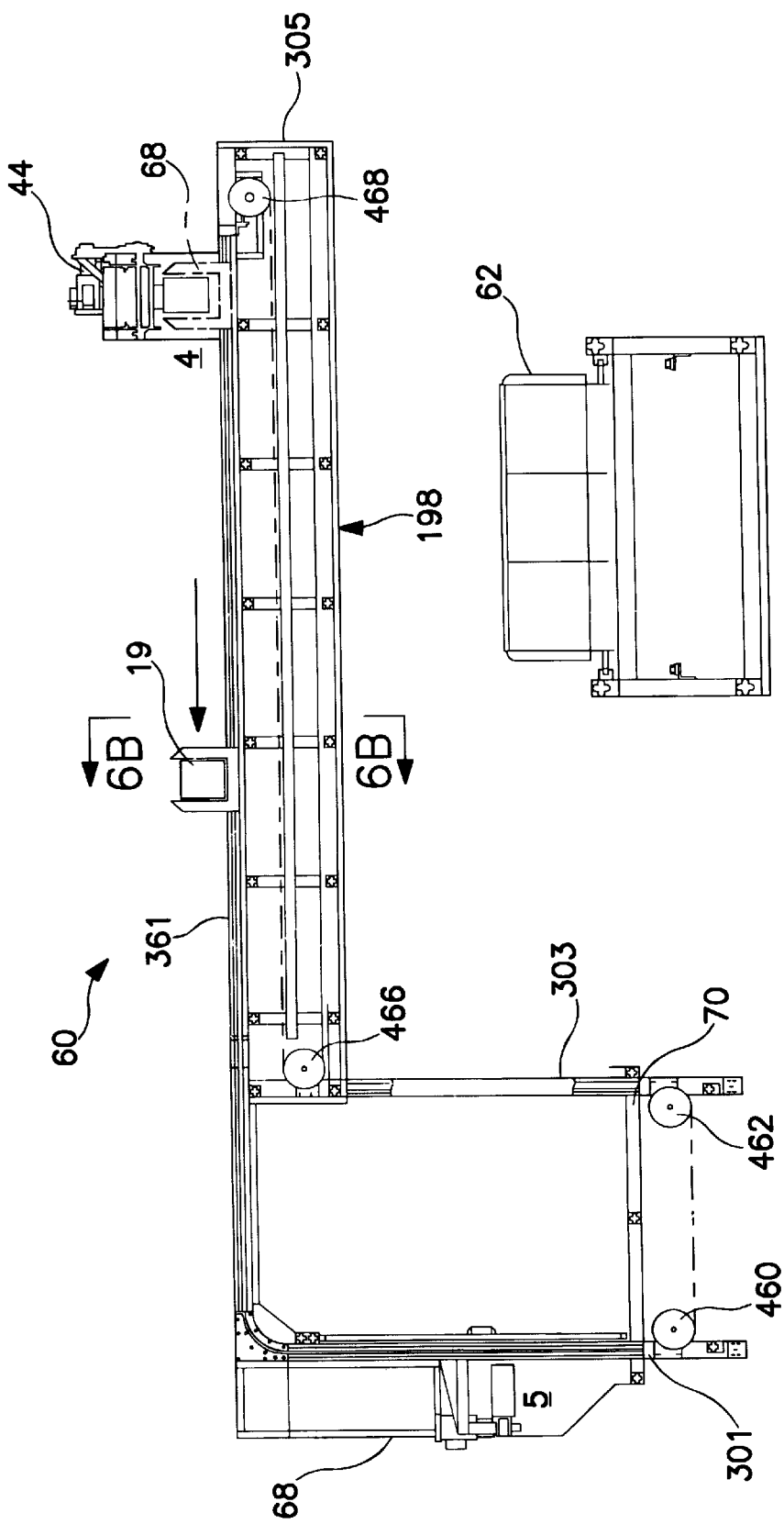
FIG. 6A is a side view of the system shown in FIG. 1 taken along a line 6—6 in FIG. 2.
FIG. 6B is a side view of the system shown in FIG. 6A taken along a line 6B—6B in FIG. 6A.

Referring to FIGS. 1 & 2, for example, one embodiment a system 10 of the present invention is shown that is capable of selectively transporting and reorienting various types of items. For example, in this embodiment, as shown in FIGS. 3 & 4, the items can be cases 19 of collapsed cardboard cartons that can later be expanded and filled with facial tissue. Specifically, the ends of each carton can be applied with glue and sealed to form a rectangular box. It should also be noted, however, that the items can generally include almost any conceivable article, including but not limited to, packaging materials, parts, assemblies, finished products, etc.

As shown in FIGS. 1 & 2, the system 10 includes a first transport apparatus 96 and a second transport apparatus 60 for selectively transporting and reorienting items. In particular, an item can be transported from a loading location 1 to either a first unloading location 3 or a second unloading location 5. As a result, the system 10 can transport items to more than one location without requiring more than one in-feed section, thereby more efficiently utilizing available space. Although referred to herein as an "unloading location", it should be understood that items need not be unloaded from such locations, and that an item can also be placed onto a conveyor, stored, etc.

The item(s) can initially be provided in a variety of forms for transportation and reorientation by system 10. As shown in FIGS. 3 & 4, for example, individual cases 19 of cartons can be stacked onto a pallet 33 to be loaded onto the apparatus 10. The pallet 33 may then be placed onto an in-feed conveyor 12. The in-feed conveyor 12 has a plurality of cylindrical rollers to facilitate transport of the pallets of cartons to the next operation. Other pallets can also be placed onto conveyors 14, 16 or 18 if desired. However, although four conveyors are illustrated and described herein, it should be understood that any number of conveyors can be utilized in the present invention. It should also be understood that such in-feed conveyors may not be required in all circumstances. For example, in some instances, individual boxes of tissue cartons can be directly placed on a lift 20.

Once positioned on a conveyor, the pallet of items can then be transferred to a lift 20. In general, any mechanism or device that is capable of lifting an item or pallet of items can be utilized as the lift 20. For example, the lift 20 is illustrated in FIGS. 1 & 4 as being a hydraulically-powered scissors lift. Unused items or pallets of items can also be discharged onto a discharge conveyor 18 if desired. The lift 20 then raises the pallet of items a certain distance so that one or more of the items contained thereon can be transferred to the first transport apparatus 96.

In this regard, referring to FIGS. 8–14, one embodiment of the first transport apparatus 96 is illustrated. As shown, the first transport apparatus 96 includes a frame 98 having first, second, third and fourth upstanding members 100, 102, 104 and 106, respectively. Each of the four upstanding members 100, 102, 104 and 106 has a first end and a second end. The first and second upstanding members 100 and 102 are joined together at their first ends by a fifth member 124. The third and fourth upstanding members 104 and 106 are joined together at their first ends by a sixth member 126. The frame 98 can be constructed out of almost any kind of material with metal, aluminum, and commercially available metal alloys. However, wood, plastic, thermoplastic, fiberglass, graphite, and other materials can be used in constructing the frame 98.

A horizontal platform 46 can also be secured to the first, second, third and fourth upstanding members 100, 102, 104 and 106, respectively. The platform 46 is sized to support a human operator and is spaced a sufficient distance away from the fifth, sixth, seventh and eighth members 124, 126, 136 and 138, respectively, so as to enable an operator to stand erect on the platform 46 without hitting his or her head.

The apparatus 96 can also include a pair of tracks 142 and 144 formed in the first, second, third, fourth, fifth and sixth members 100, 102, 104, 106, 124 and 126, respectively, that form a pair of paths 146 and 148. Each of the pair of paths 146 and 148 span at least 180 degrees and particularly 360 degrees. The pair of tracks 142 and 144 can extend below the platform 46.

Figure 8:
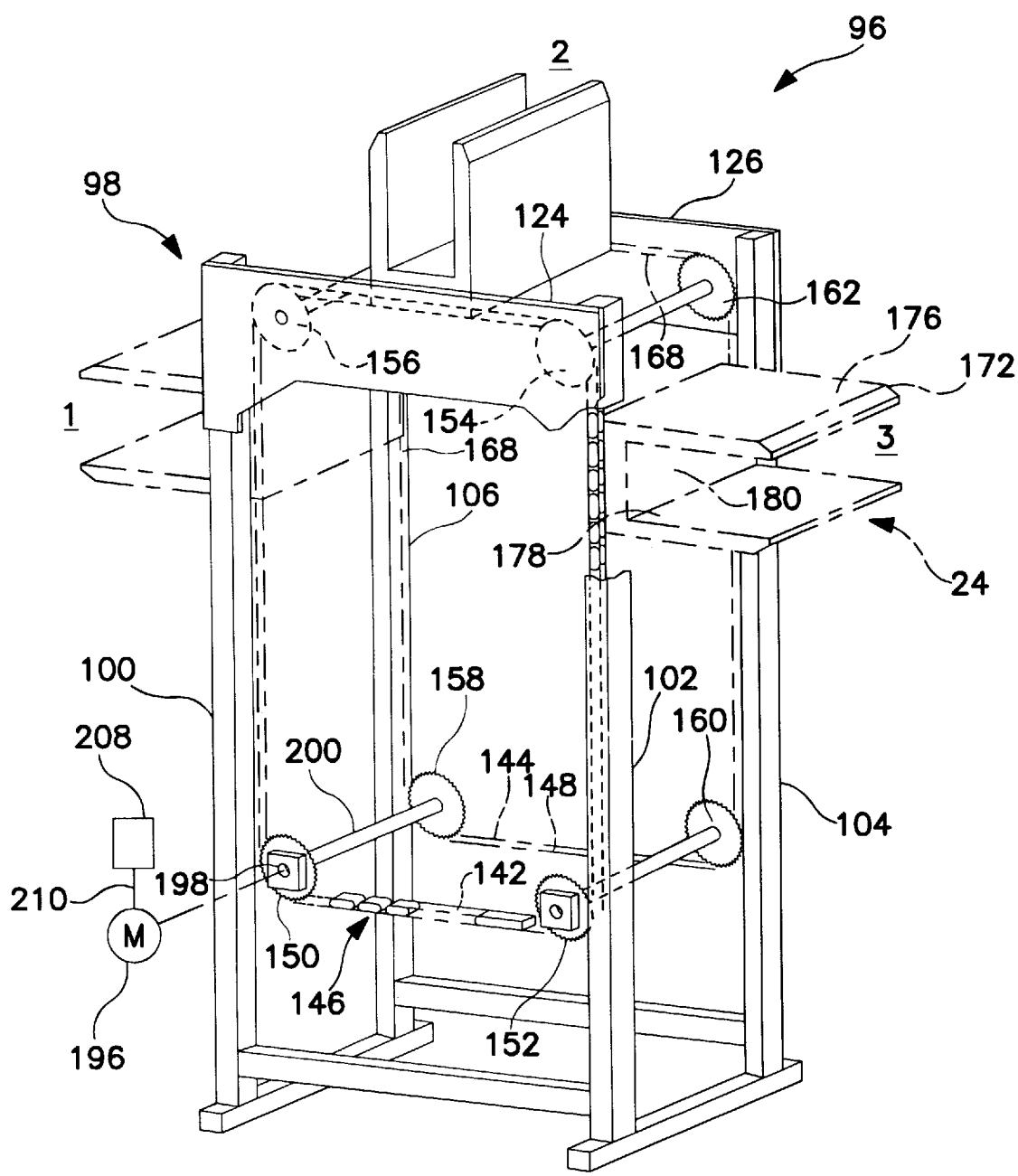
FIG. 8 is a perspective view of one embodiment of the first transport apparatus of the present invention.

The apparatus 96 further includes a first set of four sprockets 150, 152, 154, and 156, and a second set of four sprockets, three of which are shown in FIG. 8 as 158, 160, and 162. The first set of four sprockets interacts with the track 142 while the second set of four sprockets interacts with the track 144. One sprocket, for example, 150 and 158, of each set can be a drive sprocket while the remaining three sprockets of the first set, for example, 152, 154 and 156, and the remaining three sprockets of the second set can be idler tension sprockets. The first and second sets of sprockets can be rotatable and formed as a ring or disc having a plurality of gear teeth formed on its outer circumference. Alternatively, the sprockets can have various toothlike projections arranged on a wheel rim to engage the links of a chain.

Figure 9:
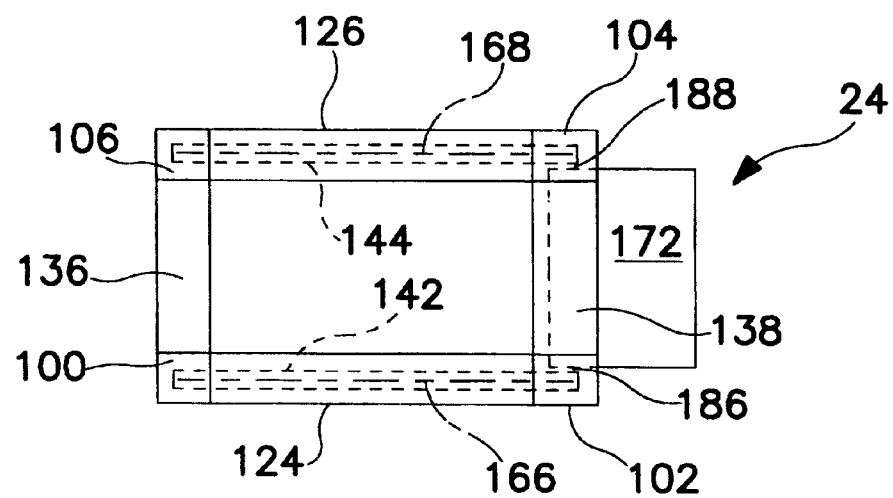
FIG. 9 is a top view of the first transport apparatus depicted in FIG. 8.

Referring to FIGS. 8 & 9, a pair of movable members 166 and 168 are shown positioned in the pair of tracks 142 and 144. For instance, the movable member 166 is positioned in the track 142, while the movable member 168 is positioned in the track 144. Each movable member 166 and 168 engages one of the sets of four sprockets to form a continuous closed loop. Each of the pair of movable members 166 and 168 can be a chain, a roller chain, a belt, a cable, etc. In the illustrated embodiment, each movable member is a continuous chain that forms a closed loop. Typically, each movable member is assembled so that it is tightly positioned about one of the two sets of four sprockets. As a result, the moveable members 166 and 168 can be moved by the rotation of the drive sprockets 150 and 158.

The first transport apparatus 96 also includes a first carrier 24 for transporting and reorienting items from one location to another location. The first carrier 24 can be any device that is capable of holding items during transportation and reorientation. In particular, the first carrier 24 can be sized and constructed according to the kind of items it is intended to transport and reorient. For instance, in some embodiments, the first carrier 24 can have a square or rectangular configuration. In other embodiments, the first carrier 24 can have an approximately C-shaped configuration. The phrase "approximately C-shaped configuration" generally includes any design that can provide a C- or U-shaped profile.

Figure 10:
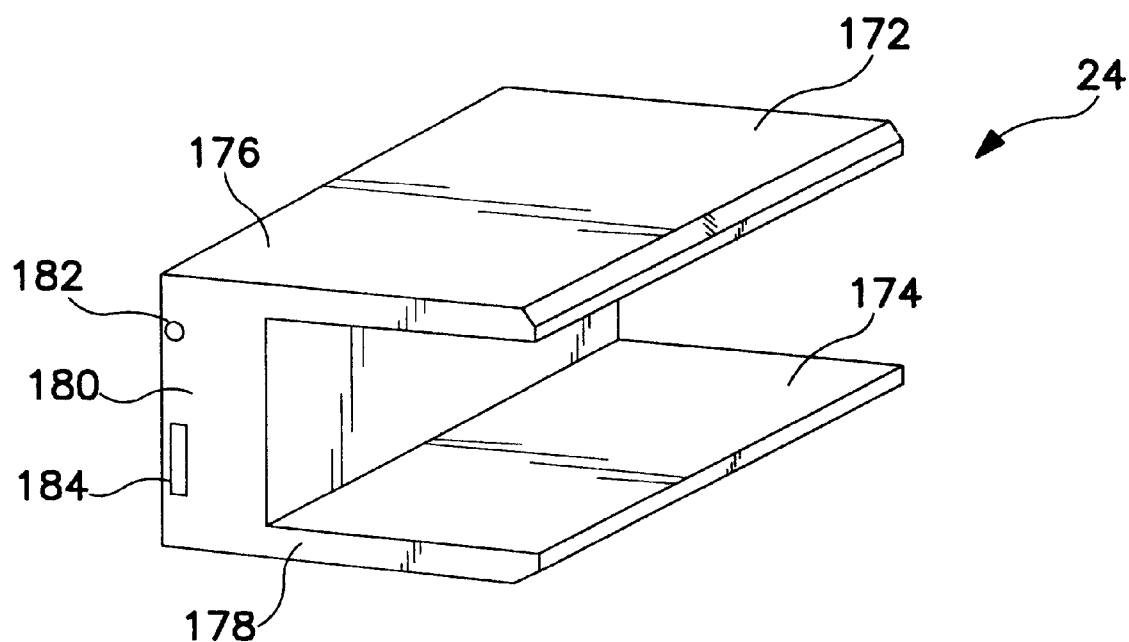
FIG. 10 is a perspective view of one embodiment of a carrier that can be used in the present invention.
Figure 11:
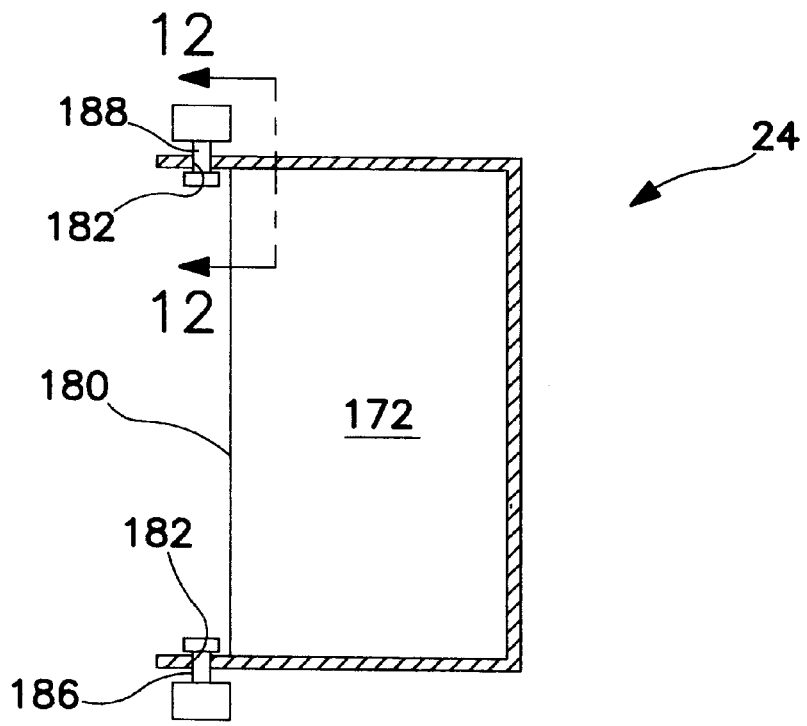
FIG. 11 is a top view of one embodiment of a carrier used in the present invention.
Figure 12:
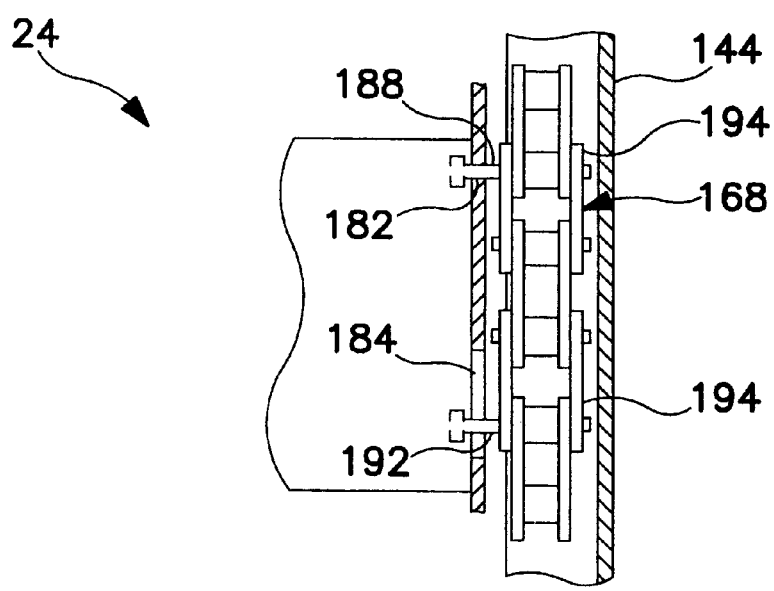
FIG. 12 is a cross-sectional view of the carrier illustrated in FIG. 11 taken along line 12—12 in FIG. 11.
Figure 13:
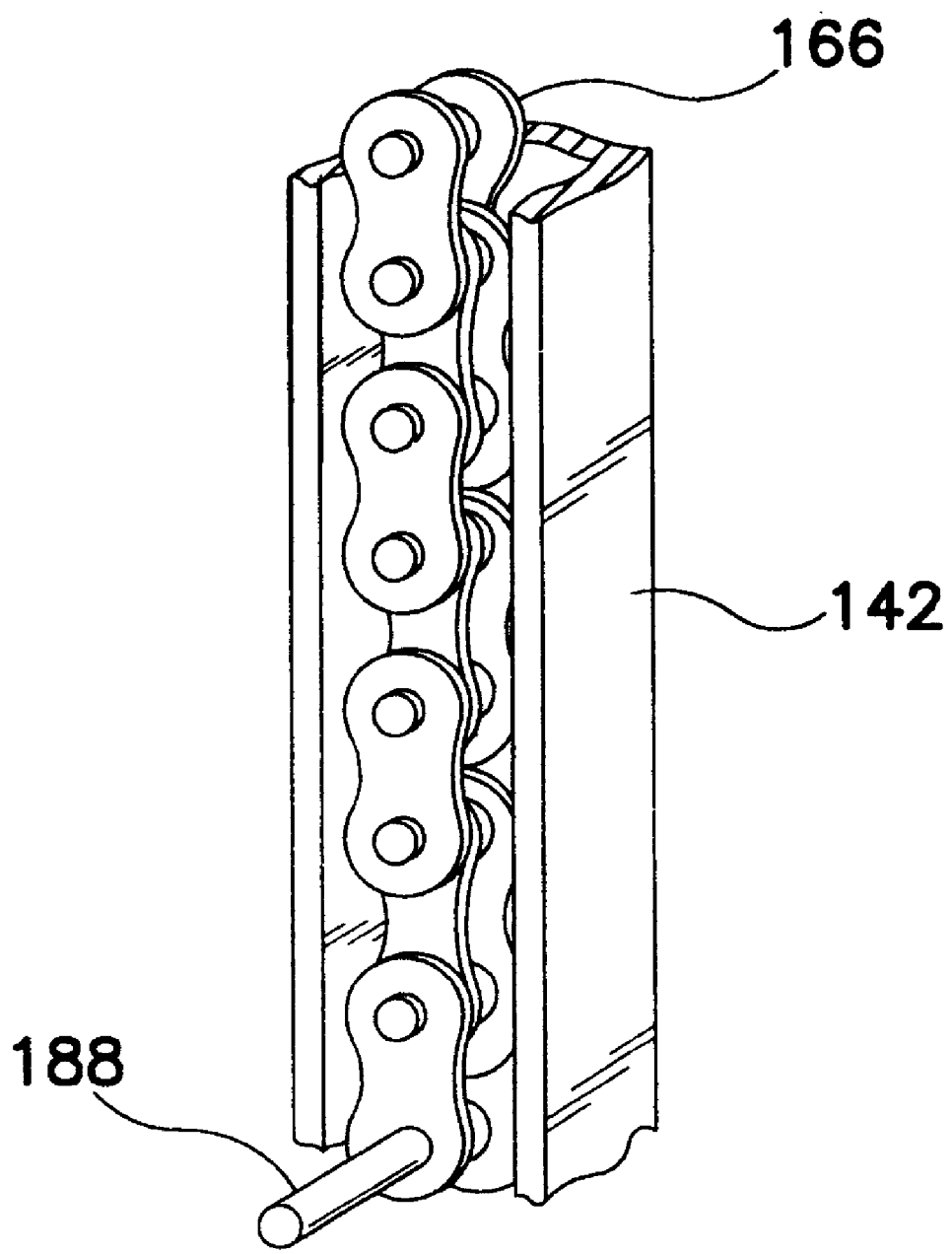
FIG. 13 is a perspective view of a section of roller chain positioned in a guide track for use in one embodiment of the present invention.

For instance, one embodiment of a first carrier 24 having an approximately C-shaped configuration is illustrated in FIG. 10. As shown, the first carrier 24 includes first and second members 172 and 174, each having a first end. The first carrier 24 also includes a third member 180 that is affixed to the first ends of the first and second members 172 and 174, respectively, to form a nonadjustable, approximately C-shaped configuration. The first and second members 172 and 174 are permanently spaced apart from one another and are aligned in a parallel relationship.

In some embodiments, each of the members 172 and 174 may have a width that is greater than the width of a third member 180. For example, when used to transport cases of tissue cartons, the members 172 and 174 can extend outwardly from the third member 180 by a distance of at least about 15 inches, particularly by at least about 20 inches, and more particularly by at least about 24 inches. Moreover, the members 172 and 174 may also be separated from one another by a distance of at least about 10 inches, particularly by a distance of between about 12 inches to about 24 inches, and more particularly by a distance of at least 12 inches. Typically, the distance separating the members 172 and 174 is less than the distance the members 172 and 174 extend from the third member 180.

Thus, in the embodiment described above, cartons contained within a case will generally not fall out of the case, even when the cartons are inverted by the reorientation of the first carrier 24. In particular, the cartons themselves can be kept together because the first and second members 172 and 174 of the first carrier 24 are spaced apart a predetermined distance. This predetermined distance can prevent the cartons from exiting the cases.

Referring to FIGS. 1–14, the first carrier 24 is connected to the apparatus 96 so that it is moveable between a loading location 1, a first transfer location 2, and a first unloading location 3. Specifically, as shown in FIGS. 1–3, an item or pallet of items can be vertically elevated by a lift 20 so that the item is positioned in relative alignment with the first carrier 24 when it is positioned at a loading location 1. For instance, as shown in FIG. 4, the lift 20 can contain a pallet 33 loaded with a plurality of cases 19 of tissue cartons.

Figure 14:
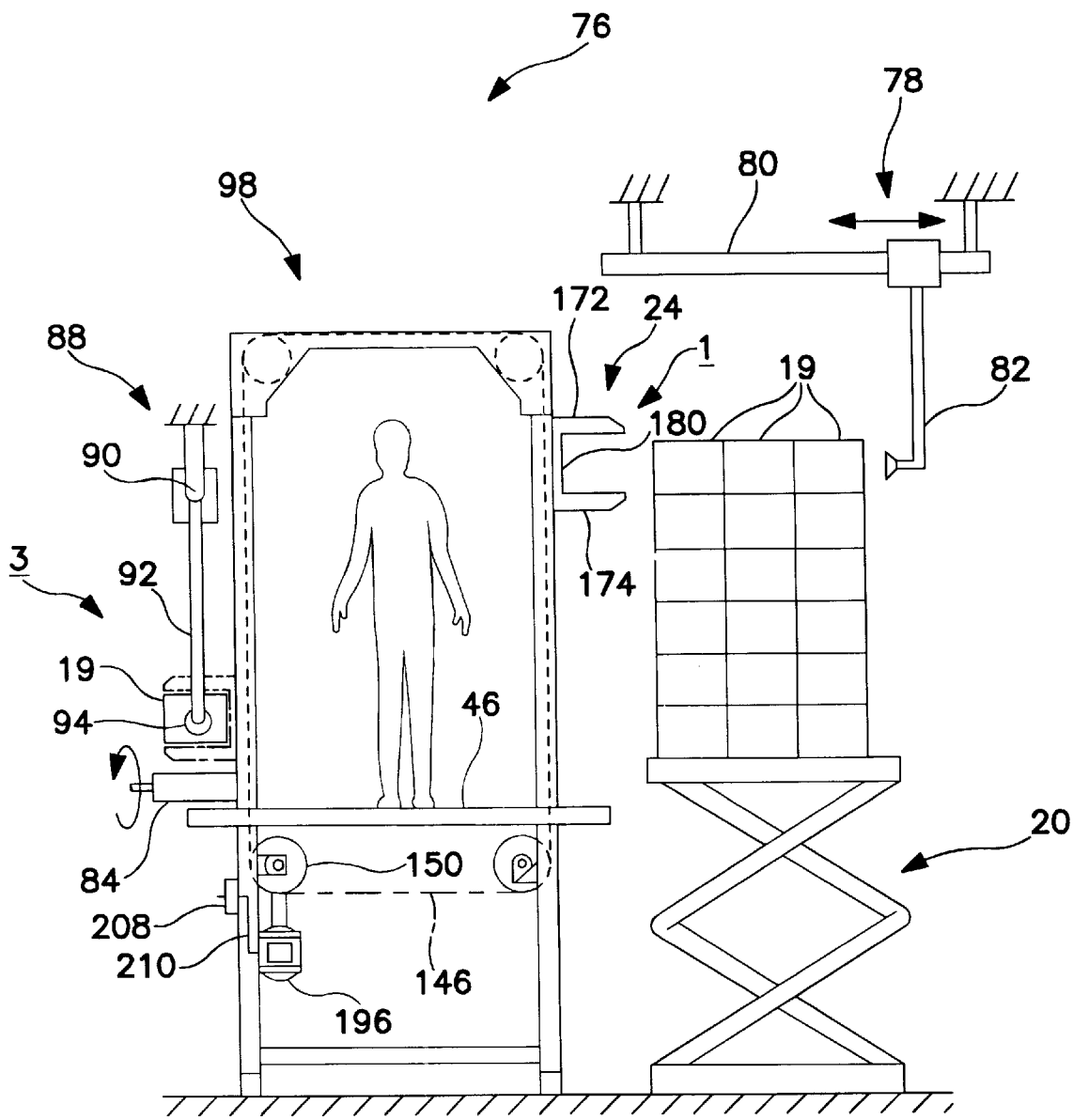
FIG. 14 is a side view of one embodiment of a first transport apparatus of FIG. 8 adjacent to cases of cartons.

As shown in FIGS. 1 & 14, a pusher assembly 78 can then be activated to load one or more items from the lift 20 into the first carrier 24. In particular, the pusher assembly 78 can move horizontally on a rail 80 so that an arm 82 can slide or push the required number items into the carrier 24. Although not required, the pusher assembly 78 may be mounted overhead the apparatus 96. However, it should be noted that the lift 20 and the pusher assembly 78 can be replaced with other types of equipment that can carry out the intended purpose, such as explained above. Alternatively, the items may be manually loaded into the first carrier 24 by a human operator if desired.

Once an item is loaded into the first carrier 24, the first carrier 24 may then transport the item from a loading location 1 to a first transfer location 2. Thereafter, from the first transfer location 2, the first carrier 24 may then move the item to a first unloading location 3. Such movement of the first carrier 24 may generally be accomplished in a variety of ways. For instance, in one embodiment, the first carrier 24 can be secured to the pair of movable members 166 and 168. The first carrier 24 can be mechanically attached to movable members 166 and 168 so that the first carrier 24 can follow the pair of movable members 166 and 168 around turns, corners and arcs of 90 degrees or more.

In one embodiment, for example, as shown in FIGS. 9–12, the first carrier 24 can be mechanically attached to the movable members 166 and 168 utilizing a pin/aperture arrangement. For example, the third member 180 of the first carrier 24 can contain a pair of apertures 182 and a pair of distally spaced slots 184 (one of which is shown). One of the pair of apertures 182 and one of the pair of slots 184 are formed on each side of the first carder 24. Each aperture 182 is vertically aligned relative to a corresponding slot 184 with the apertures 182 being formed closer to the first member 172 and the slots 184 being formed closer to the second member 174. The pair of apertures 182 are sized to receive a pair of outwardly extending pins 186 and 188, while the pair of slots 184 are sized to receive a pair of outwardly extending pins 192 (one of which is shown). The pin 186 and one of the pins 192 (not shown) are secured to the movable member 166, while the pin 188 and one of the pins 192 are secured to the other movable member 168.

For example, when the pair of movable members 166 and 168 are roller chains containing a plurality of links 194, a pin 186 or 188 can be affixed to a first link 194 and a second pin 192 can be affixed to a second link 194 that is spaced apart from the first link 194. The pins 186, 188, and 192 are secured to the first carrier 24 such that the pins 192, which are arranged in the slots 184, are initially located at about the center of the slots 184 and can move up or down within the slots 184. This arrangement will allow the first carrier 24 to follow the pair of movable members 166 and 168 around a turn or arc, such as the 90 degree bends around the sprockets 154, 156, 162 and an additional sprocket (not shown) connected to sprocket 156.

As the chains 166 and 168 transcribe the 90 degree arc, the pin 186 and one of the pins 192 (not shown) move closer to the pin 188 and one of the pins 192. As a result, the pins 192, which are positioned within the slots 184, can move within the slots 184 without bending or breaking. This particular arrangement of the pins 186, 188, 192 enables the first carrier 24 to follow the movable members 166 and 168 through a predetermined path of at least 180 degrees and particularly through a path of 360 degrees.

Thus, as shown in FIG. 1, the first carrier 24 can follow the moveable members through a path of approximately 90 degrees relative to the center of the frame until it reaches the first transfer location 2, and then through another path of approximately 90 degrees until it reaches the first unloading location 3. At the first unloading location 3, the items contained within the first carrier 24 can then be unloaded onto a collection area 53 (See FIG. 3).

One method of removing the items from the first carrier 24 is to manually push the items out of the first carrier 24. Alternatively, as shown in FIGS. 2, 3 & 14, an unloading assembly 88 can move horizontally on a rail 90 and an arm 92 can slide or pull the required number of items out of the first carrier 24. For example, in one embodiment, the arm 92 can have a suction cup 94 that can temporarily attach to each item and pull it out of the first carrier 24. The unloading assembly 88 can be mounted overhead in a similar fashion as the pushing assembly 78. In one embodiment, as shown in FIG. 14, the items that have been transferred and reoriented can be unloaded onto a conveyor 84 for transportation of the items to other operations.

Once an item is unloaded from the first carrier 24, the first carrier 24 can be maneuvered in a reverse path of 90 degrees or 180 degrees to return to the loading location 1. Alternatively, the carrier 24 may be moved through a path of more than 180 degrees, such as through a path of 270 degrees or 360 degrees until it again reaches the loading location 1, where other items can then be placed into the first carder 24 for transportation and reorientation.

In addition to transporting items from a loading location 1 to a first unloading location 3, it may also be desirable to transport and reorient items from the loading location 1 to a second unloading location 5. For example, it may be desired that one case of tissue cartons be sent to one location for one type of processing, while another case of cartons be sent to another location for the same or a different type of processing.

Thus, in accordance with the present invention, a second transport apparatus can be utilized to transport and reorient items from a second transfer location 4 to a second unloading location 5. For example, referring to FIGS. 1–7, one embodiment of the system 10 includes a second transport apparatus 60 that is in operative communication with the first transport apparatus 96. In particular, when the first carrier 24 of the first transport apparatus 96 reaches the first transfer location 2, such as described above, a transport apparatus 44 can be activated to force the items off of the first transport apparatus 96 onto the second transport apparatus 60.

In general, the transport apparatus 44 can be any type of device that is capable of moving items from the first transport apparatus 96 to the second transport apparatus 60. As shown, in one embodiment, the transport apparatus 44 can move one or more items off of the first carrier 24 while it is positioned in the first transfer location 2. Once pushed off the first carrier 24, the items can be transported to the second transport apparatus 60.

In one embodiment, the transport apparatus 44 can contain a pusher assembly constructed in a manner similar to the pusher assembly 78. In particular, a pusher assembly can move horizontally on a rail (not shown) so that an arm (not shown) can slide or push the required number items, cases, or cartons out of the first carrier 24. Although not required, the pusher assembly may also be mounted overhead.

In addition to a pusher assembly, the transport apparatus 44 may also contain a variety of devices, mechanisms, assemblies, and/or features. For instance, the transfer apparatus may include rollers, conveyors, lift assemblies, cranes, plates, manual operations, etc.

In another embodiment, the transfer apparatus 44 also includes a transfer section. In general, the transfer section can be designed in any suitable manner to facilitate the transfer of items from the first transport apparatus 96 to the second transport apparatus 60. For example, in one embodiment, the transport section may be a moving conveyor. Moreover, in another embodiment, as shown in FIGS. 1–3, the transfer section can be a plate 50 made of a certain material, such as a metal. When the transfer section is a plate 50, the transport apparatus 44 can be configured to move the items from a first end 55 of the plate 50 to a second end 57 of the plate 50. When the transfer section is a moving conveyor, however, the transport apparatus 44 need only be configured to push the items onto the transfer section. However, it should be understood that a transfer section need not be utilized. For example, in some instances, the second carrier 62 at the second transfer location 4 can be positioned directly adjacent to the first carrier 24 at the first transfer location 2 such that a transfer section is not required.

In the depicted embodiment, once an item reaches the second end 57 of the plate 50, it is then positioned onto the second transport apparatus 60. In general, the second transport apparatus 60 can be any type of device that is capable of transporting and reorienting an item from one location to another location. For example, the apparatus 60 may be similar or identical to the apparatus 96.

In this regard, referring to FIGS. 1–3, 5, and 6A–6B, one embodiment of the second transport apparatus 60 is illustrated. The second transport apparatus 60 includes a frame 198 having upstanding members 300, 301, 302, 303, 304, and 305. Each of the six upstanding members 300, 301, 302, 303, 304, and 305 has a first end and a second end. The first and second upstanding members 300 and 301 are joined together at their first ends by a seventh member 330. The fifth and sixth upstanding members are joined together at their first ends by an eighth member 332. The seventh and eighth members 330 and 332 each have a first end and a second end. A tenth member 360 joins the first end of the seventh member 330 to the first end of the eighth member 332, while an eleventh member 361 joins the second end of the seventh member 330 to the second end of the eighth member 332.

The frame 198 can generally be constructed out of any kind of material, such as metals (e.g., aluminum, commercially available metal alloys, etc.). However, wood, plastic, thermoplastic, fiberglass, graphite, etc., can also be used. A horizontal platform 70 can also be secured to the first, second, third and fourth upstanding members 300, 301, 302 and 303, such as described above.

In addition, the apparatus 60 can also include a pair of tracks formed in frame 198, such as described above. In particular, a pair of paths can be formed to allow the second carrier 62 to span at least 90 degrees and, in some instances, up to 360 degrees. Moreover, a pair of movable members, such as described above and illustrated in FIG. 13, can also be positioned in the pair of tracks.

The apparatus 60 can further include a first set of five sprockets 450, 452, 454, 456, and 458, and a second set of five sprockets, four of which are shown in FIG. 6A as 460, 462, 466, and 468. The first set of five sprockets can interact with one track (not shown), while the second set of five sprockets can interact with another track (not shown). Although not required, one sprocket of each set can be a drive sprocket, while the remaining four sprockets can be idler tension sprockets. The sprockets can be rotatable and formed as a ring or disc having a plurality of gear teeth formed on its outer circumference. Alternatively, the sprockets can have various toothlike projections arranged on a wheel rim to engage the links of a chain.

A movable member, such as described above, can engage one of the sets of five sprockets to form a continuous closed loop. Typically, each movable member is assembled so that it is tightly positioned about one of the two sets of four sprockets. As a result, the moveable members can be moved by the rotation of the drive sprockets.

In general, the second transport apparatus 60 can also include a second carrier 62 for transporting and reorienting items from one location to another location. The second carrier 62 can generally be any device that is capable of holding items during transportation and reorientation. For example, in one embodiment, the second carrier 62 can be identical to the first carrier 24 of the first transport apparatus 96.

Referring to FIGS. 1–6B, the second carrier 62 is connected to the apparatus 60 so that it is moveable between a second transfer location 4 and a second unloading location 5. Specifically, one or more items can pushed by the transport apparatus 44 from the plate 50 into the second carrier 62, while it is positioned at the second transfer location 4. Moreover, to facilitate placement of one or more items into the second carrier 62, the plate 50 can be positioned into relative alignment with the second carder 62 so that the transport apparatus 44 can more easily move the items into the second carrier 62.

As indicated by the directional arrow shown in FIG. 6A, after being placed into the second carrier 62, one or more items can then be moved by the second carrier 62 until the second carrier 62 reaches the second unloading location 5. Such movement of the second carrier 62 may generally be accomplished in a variety of ways. For instance, in one embodiment, the second carrier 62 can be secured to a pair of movable members. Specifically, the second carrier 62 can be mechanically attached to movable members, such as described above, so that the second carrier 62 can follow the pair of movable members around turns, comers and arcs of 90 degrees or more.

Thus, as shown in FIGS. 1 and 6A, the second carrier 62 can follow the moveable members through a path of approximately 90 degrees relative to the center of its frame until it reaches the second unloading location 5. At the second unloading location 5, the items contained within the second carrier 62 can then be unloaded from the second carrier 62 onto a unloading area 63 (See FIG. 3) by an unloading assembly 68, which can be similar or identical in design to the unloading assembly 88 described above.

Once the items are unloaded from the second carrier 62, the second carrier 62 can be maneuvered in a reverse path of 90 degrees to return to the second transfer location 4. Alternatively, second carrier 62 may be moved through a path of more than 180 degrees, such as through a path of 270 degrees or 360 degrees until it again reaches the second transfer location 4, where other items can then be placed into the second carrier 62 for transportation and reorientation.

Figure 7:
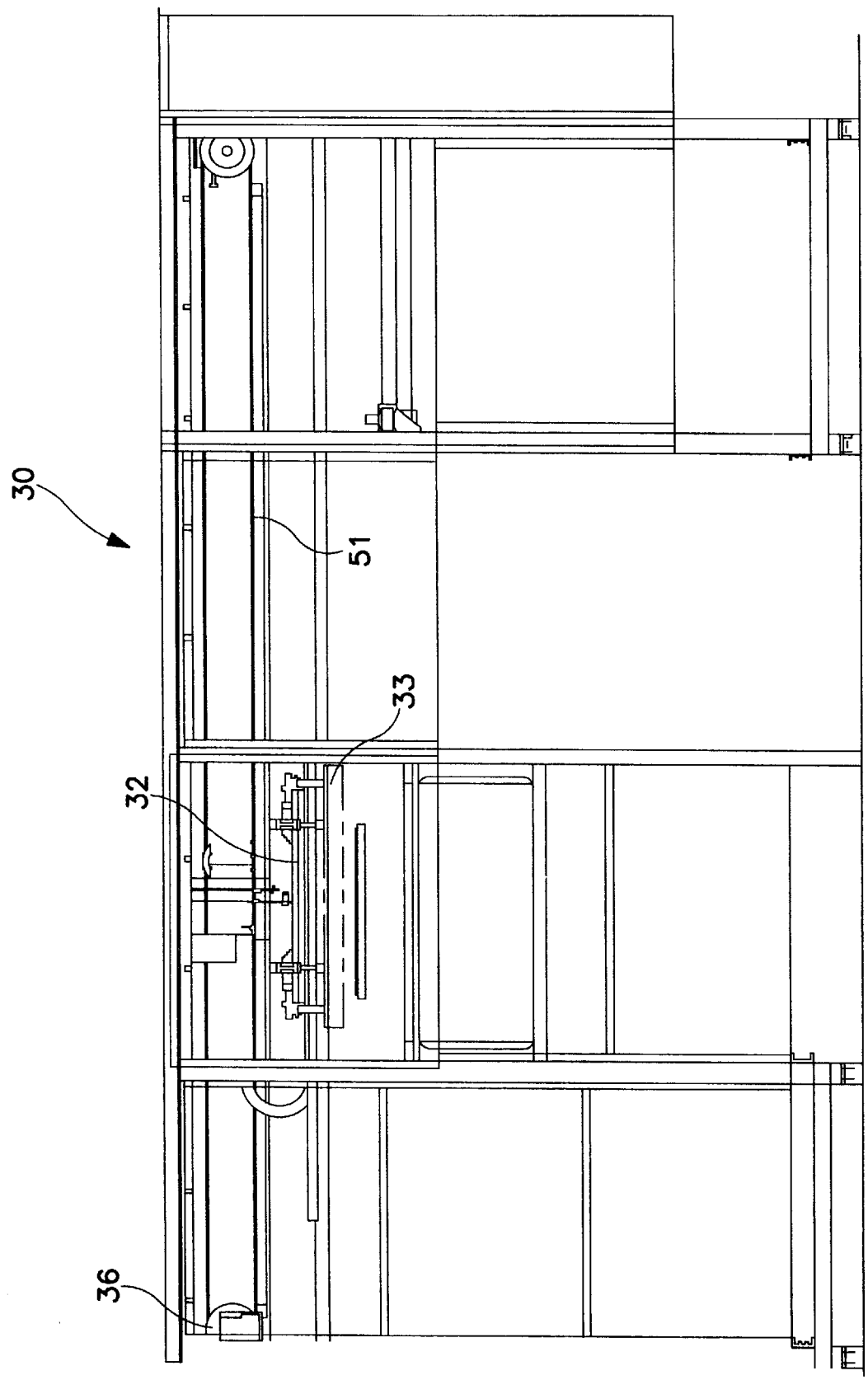
FIG. 7 is a side view of the system shown in FIG. 1 taken along a line 7—7 in FIG. 2.

Referring to FIGS. 1, 4, & 7, in some embodiments, the system 10 may optionally contain a waste handling unit 30. Although not required, the waste handling unit 30 can generally facilitate removal of various pallets, sheets, cardboard, and other materials from the system 10. For example, a pallet of items, such as cases of tissue cartons, can generally be made of wood, cardboard, plastics, or any other material. Such pallets also typically contain a sheet, such as cardboard, between each layer of cases. It is normally desired that these sheets and pallets be removed from the system 10 for recycling or waste processing.

Thus, for example, the waste handling unit 30 can contain a sheet removal device 34. For instance, in one embodiment, suction cups 34*a* may be utilized as the sheet removal device 34. The sheet removal device 34 can grasp a sheet located on a pallet 33, which is positioned on the lift 20. Thereafter, the sheet removal device 34 can then carry the sheet to a sheet removal station. At the sheet removal station, the sheet removal device 34 can be lowered down to drop the sheet into a collection area, such as a bin 38. Moreover, in some instances, the sheet removal device 34 can drop the sheet onto a slide-shaped member (not shown) so that it slides into the bin 38. After dropping a sheet into the bin 38, the sheet removal device 34 can return to the pallet 33 to remove one or more other sheets.

Once all of the sheets have been removed, the pallet 33 can then be removed. In some instances, such as when the pallet 33 is made from cardboard, the sheet removal device 34 (e.g., suction cups 34*a*) may be utilized to grasp the pallet 33. In other instances, such as when the pallet 33 is made from wood, an optional pallet removal device 32 (See FIG. 7) can be used.

In one embodiment, for example, the pallet removal device 32 can be a set of four clamps that grasp the sides of the pallet 33 as the pallet 33 remains on the lift 20. The pallet removal device 32 can then carry the pallet 33 until it is in relative alignment with a pallet collection area 21, where it can lower and drop the pallet 33 onto the pallet collection area 21. In some instances, a lift (not shown), such as a scissors lift, can also be positioned onto the pallet collection area 21 to facilitate the transfer of the pallet 33 to the pallet collection area 21.

The sheet removal device 34 and the pallet removal device 32 can generally be maneuvered in a variety of ways. For example, as shown, the pallet removal device 32 and the sheet removal device 34 can be attached to a chain 51 that is wrapped around rotatable sprockets 36. By rotating the sprockets 36 in a certain direction, the pallet removal device 32 and sheet removal device 34 can thus follow the movement of the chain 51. The pallet removal device 32 and the sheet removal device 34 may or may not be formed as the same assembly.

To facilitate the transportation and reorientation of items, an apparatus of the present invention may also include a variety of control features. Referring to FIG. 8, for example, one embodiment of the present invention includes a system 10 that utilizes at least one controller 208. The controller can be a programmable logic computer (PLC), such as an Allen-Bradley Controllogix Processor, although any other controller suitable for controlling the system described above, is generally acceptable. Alternately, hard-wired circuitry, relays, software, etc., could be substituted for the PLC and used as controller 208.

For instance, the controller 208 can be designed to activate and deactivate a power unit 196 of apparatus 96 at set time intervals so as to rotate two drive sprockets 150 and 158. In particular, as shown, the apparatus 96 can include a power unit 196 that is capable of driving the two drive sprockets 150 and 158. The power unit 196 can be a mechanical, electrical, hydraulic, or pneumatic motor or it could be a gasoline or diesel engine. In the illustrated embodiment, for instance, the power unit 196 is an electrical servo-type motor, which may run on direct current or alternating current.

The power unit 196 is electrically connected to a controller 208 by an electrical lead or wire 210. The power unit 196 is physically connected to the drive sprocket 150 via an output shaft 198. In turn, the first drive sprocket 150 of the first set of sprockets is connected to the drive sprocket 158 of the second set of sprockets by a connecting shaft 200. This arrangement permits the two drive sprockets 150 and 158 to be rotated simultaneously and in the same direction. Other drive arrangements, such as the use of differentials, can be used as well.

The controller 208 can activate the power unit 196, which in turn, rotates the output shaft 198 so as to turn the two drive sprockets 150 and 158. As the two drive sprockets 150 and 158 rotate, the pair of movable members 166 and 168 can move in either a clockwise or counter-clockwise direction to transport the first carrier 24 to a certain predetermined and preselected location.

Besides controlling the power unit and rotation of the drive sprockets, the same or a different controller can also be provided to control a variety of other attributes of the system 10. For example, the system 10 can include one or more servo-controllers in communication with one or more sensors, such as photoelectric sensors. Sensors can be utilized to detect a variety of system attributes, such as the position of the first carrier 24, the position of the second carrier 62, the position of the lift 20, etc. For example, a controller can be connected to each sensor by wiring (not shown).

In response to the detection of a certain position or operator input, one or more of the controllers can activate or deactivate certain attributes of the system 10. For instance, when a sensor indicates that the lift 20 is in alignment with the first carrier 24 at the loading location 1, it can send a signal to a control mechanism. The controller can then send a signal to activate the motor of the pusher assembly 78 to move one or more items into the first carrier 24. In one embodiment, for example, a controller can be used to activate or deactivate a servo-type motor for driving the pusher assembly 78.

In accordance with another aspect of the invention, a related method is provided for transporting and reorienting at least one item. The method includes loading an item into a first carrier 24 at a loading location 1. The first carrier 24 is movably secured to a first frame 98. The method further includes moving the first carrier 24 from the loading location 1 to a first transfer location 2 and selecting one of the following steps: either moving the first carrier 24 from the first transfer location 2 to a first unloading location 3, or moving the item from the first carrier 24 at the first transfer location 2 to a second carrier 62 that is movably secured to a second frame 60 and located at a second transfer location 4, and moving the second carrier 62 from the second transfer location 4 to a second unloading location 5. The method also includes unloading the item from the first carrier 24 or the second carrier 62. The loading location 1 may have an orientation approximately 90 degrees in relation to the first transfer location 2 and approximately 180 degrees in relation to the first unloading location 3. The second transfer location 4 may have an orientation approximately 90 degrees in relation to the second unloading location 5. Thus, items may be selectively transported according to the claimed method from a loading location to one of two unloading locations.

While the invention has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A system for selectively transporting and reorienting items from a loading location to one of a first or second unloading locations, said system comprising:
   a) a first transport apparatus for selectively transporting and reorienting items from the loading location to either a first transfer location or the first unloading location, said first transport apparatus including:
      i) a first frame; and
      ii) a first carrier movably secured to said first frame, said first carrier being movable about said first frame from said loading location to said first transfer location and said first unloading location, said first carrier being configured to transport and reorient items from said loading location to either said first transfer location or said first unloading location;
   b) a second transport apparatus for transporting and reorienting items from a second transfer location to the second unloading location, said second transport apparatus including:
      i) a second frame; and
      ii) a second carrier movably secured to said second frame, said second carrier being movable about said second frame from said second transfer location to said second unloading location, said second carrier being configured to transport and reorient items from said second transfer location to said second unloading location; and
   c) a transfer apparatus that operatively connects said first transport apparatus to said second transport apparatus, said transfer apparatus selectively moving items from said first transfer location to said second transfer location.

2. A system as defined in claim 1, wherein said first frame contains at least two upstanding members having a first end and a second end, wherein at least two of said upstanding members are joined together at said first ends by a third member.

3. A system as defined in claim 1, wherein said second frame contains at least two upstanding members containing a first end and a second end, wherein at least two of said upstanding members are joined together at said first ends by a fourth member.

4. A system as defined in claim 1, wherein said first carrier forms an approximately C-shaped configuration.

5. A system as defined in claim 1, wherein said second carrier forms an approximately C-shaped configuration.

6. A system as defined in claim 1, wherein said first transfer location has an orientation approximately 90 degrees in relation to said loading location.

7. A system as defined in claim 1, wherein said first unloading location has an orientation approximately 180 degrees in relation to said loading location.

8. A system as defined in claim 1, wherein said second unloading location has an orientation approximately 90 degrees in relation to said second transfer location.

9. A system as defined in claim 1, further comprising a first pusher assembly, said first pusher assembly being configured to load items into said first carrier when said first carrier is located at said loading location.

10. A system as defined in claim 1, wherein said transfer apparatus comprises a second pusher assembly, said second pusher assembly being configured to push items from said first carrier when rotated to said first transfer location into said second carrier when rotated to said second transfer location.

11. A system as defined in claim 1, further comprising at least one sensor.

12. A system as defined in claim 11, further comprising a controller in communication with said at least one sensor.

13. A system as defined in claim 1, further comprising a waste handling unit.

14. A system as defined in claim 13, wherein said waste handling unit contains a pallet removal device.

15. A system as defined in claim 13, wherein said waste handling unit contains a sheet removal device.

16. A system for selectively transporting and reorienting items from a loading location to one of a first or second unloading locations, said system comprising:
   a) a first transport apparatus for selectively transporting and reorienting items from the loading location to either a first transfer location or the first unloading location, said first transport apparatus including:
      i) a first frame; and
      ii) a first carrier movably secured to said first frame, said first carrier being movable about said first frame at least about 90 degrees from said loading location to said first transfer location and at least about 180 degrees from said loading location to said first unloading location, said first carrier being configured to transport and reorient items from said loading location to either said first transfer location or said first unloading location; and
   b) a second transport apparatus for transporting and reorienting items from a second transfer location to the second unloading location, said second transport apparatus including:
      i) a second frame; and
      ii) a second carrier movably secured to said second frame, said second carrier being movable about said second frame at least about 90 degrees from said second transfer location to said second unloading location, said second carrier being configured to transport and reorient items from said second transfer location to said second unloading location; and
   c) a transfer apparatus that operatively connects said first transport apparatus to said second transport apparatus, said transfer apparatus selectively moving items from said first transfer location to said second transfer location.

17. A system as defined in claim 16, wherein said first frame contains at least two upstanding members having a first end and a second end, wherein at least two of said upstanding members are joined together at said first ends by a third member.

18. A system as defined in claim 16, wherein said second frame contains at least two upstanding members having a first end and a second end, wherein at least two of said upstanding members are joined together at said first ends by a fourth member.

19. A system as defined in claim 16, wherein said first carrier forms an approximately C-shaped configuration.

20. A system as defined in claim 16, wherein said second carrier forms an approximately C-shaped configuration.

21. A system as defined in claim 16, further comprising a first pusher assembly, said first pusher assembly being configured to load items into said first carrier when said first carrier is located at said loading location.

22. A system as defined in claim 16, wherein said transport apparatus comprises a second pusher assembly, said second pusher assembly being configured to push items from said first carrier rotated to said first transfer location into said second carrier rotated to said second transfer location.

23. A system as defined in claim 16, further comprising at least one sensor and a controller in communication with said at least one sensor.

24. A method of transporting and reorienting at least one item, said method comprising the steps of:
   a) loading an item into a first carder at a loading location, said first carrier being movably secured to a first frame;
   b) moving said first carder from said loading location to a first transfer location;
   c) selecting one of the following steps:
      i) moving said first carrier from said first transfer location to a first unloading location; or
      ii) moving said item from said first carrier at said first transfer location to a second carrier that is movably secured to a second frame and located at a second transfer location, and moving said second carrier from said second transfer location to a second unloading location; and
   d) unloading said item from said first carrier or said second carrier.

25. A method as defined in claim 24, wherein said first transfer location has an orientation approximately 90 degrees in relation to said loading location.

26. A method as defined in claim 24, wherein said first unloading location has an orientation approximately 180 degrees in relation to said loading location.

27. A method as defined in claim 24, wherein said second unloading location has an orientation approximately 90 degrees in relation to said second transfer location.

28. A method as defined in claim 24, wherein said item is a case containing at least one carton.

29. A method as defined in claim 24, wherein a pusher assembly moves said item from said first carrier to said second carrier.

30. A method as defined in claim 24, wherein a pusher assembly loads said item into said first carrier.

* * * * *